United States Patent
Hayase et al.

(10) Patent No.: US 9,156,625 B2
(45) Date of Patent: Oct. 13, 2015

(54) OBJECT DETECTING ACTUATOR AND OBJECT DETECTING SWITCH

(71) Applicant: OMRON Corporation, Kyoto (JP)

(72) Inventors: Tetsuo Hayase, Ichinomiya (JP); Kokichi Tobita, Unnan (JP); Manabu Takahashi, Okayama (JP); Junya Mishima, Takatsuki (JP)

(73) Assignee: OMRON CORPORATION, Kyoto (JP)

( * ) Notice: Subject to any disclaimer, the term of this patent is extended or adjusted under 35 U.S.C. 154(b) by 272 days.

(21) Appl. No.: 13/923,111

(22) Filed: Jun. 20, 2013

(65) Prior Publication Data

US 2014/0000409 A1    Jan. 2, 2014

(30) Foreign Application Priority Data

Jun. 29, 2012  (JP) ................. 2012-147860

(51) Int. Cl.
  *B65G 43/08* (2006.01)
  *H01H 21/28* (2006.01)
  *C22C 33/02* (2006.01)

(52) U.S. Cl.
  CPC ............ *B65G 43/08* (2013.01); *C22C 33/0278* (2013.01); *H01H 21/28* (2013.01); *Y10T 74/20582* (2015.01)

(58) Field of Classification Search
  CPC .............. B65G 43/08; Y10T 74/20582; C22C 33/0278; H01H 21/28
  USPC .................... 200/47, 329, 332, 335–336, 293
  See application file for complete search history.

(56) References Cited

U.S. PATENT DOCUMENTS

| 4,762,972 A | * | 8/1988 | Roeser ...................... 200/302.1 |
| 2003/0010614 A1 | * | 1/2003 | Takenaka et al. .............. 200/47 |
| 2011/0317949 A1 | | 12/2011 | Ito et al. |

FOREIGN PATENT DOCUMENTS

| CN | 102356249 A | 2/2012 |
| JP | 2006-164665 A | 6/2006 |

OTHER PUBLICATIONS

A copy of the Office Action from the corresponding Chinese Patent Application No. 201310250578.8 issued on Jan. 13, 2015.

* cited by examiner

*Primary Examiner* — Edwin A. Leon
(74) *Attorney, Agent, or Firm* — Shinjyu Global IP

(57) ABSTRACT

An object detecting actuator and an object detecting switch with increased durability. The actuator in one embodiment includes a roller that receives a load of an external force; and a roller lever to which the roller is rotatably attached by means of a rotary shaft, the actuator being a displacement member that is displaced in accordance with the load of the force received by the roller, wherein the roller is constituted by a sintered body of stainless steel material impregnated with lubricating oil, and a density of the sintered body of stainless steel material is in a range of 6.45 to 6.7 g/cm$^3$.

11 Claims, 2 Drawing Sheets

OBJECT DETECTING ACTUATOR AND OBJECT DETECTING SWITCH

CROSS REFERENCE TO RELATED APPLICATION

This application claims the benefit of priority to Japanese Patent Application No. 2012-147860, filed on Jun. 29, 2012 which is incorporated by reference herein.

BACKGROUND OF THE INVENTION

The present invention relates to an object detecting actuator and an object detecting switch.

Conventionally, there are known limit switches used on factory production lines to detect that an object such as a product to be processed has been transferred to a predetermined position, and to automatically activate processing machinery. The limit switch is provided with an actuator, and passage of a conveyed object is detected by contact of the object with the actuator.

For example, Japanese Unexamined Patent Publication No. 2006-164665 (published on Jun. 22, 2006) discloses a limit switch that detects the passage of an object by contact with a stainless steel material actuator. The actuator has a roller lever and a roller, and the roller is rotatably attached to the roller lever by means of a rotary shaft. Consequently, friction between the object and the actuator during passage of the object is reduced.

Generally, the roller is constituted by a sintered body of stainless steel material as a porous material, and oil is permeated into a plurality of holes. The oil therefore seeps out onto the surface of the roller when the roller is rotating, and lubrication performance of the contact portions of the rotary shaft and the roller is improved.

In recent years, the loads placed on actuators have been increasing, such as increases in the weight of objects to be detected, and increases in contact frequency or the number of times of contact. Consequently, actuators having an even greater strength are being pursued. For example, high-density sintered bodies (for example, 6.9 g/cm$^3$) are being used to manufacture high-strength actuators.

However, as the loads have been progressively increasing, it has become no longer possible to ensure a sufficient lifespan with actuators manufactured by means of conventional technique.

SUMMARY OF THE INVENTION

The present invention has been devised to solve the problems described above, and an object thereof is to provide an object detecting actuator and an object detecting switch with increased durability.

The inventors of the present application have examined the reason for not being able to ensure a sufficient lifespan. As a result, they have discovered that since it is not possible to sufficiently permeate oil into holes of sintered body, there is an increase in friction at contact portions of a roller and a rotary shaft, and the contact portions are therefore easily worn away and the actuator needs to be replaced sooner. In order to reduce the friction, the inventors therefore, by trial and error, reduced the density of the sintered body, increased the number of holes, and increased the amount of the impregnated oil. As a result, it was found that, although the strength decreased commensurately with the decrease in density, the increase in the amount of oil seepage resulted in extending the lifespan, which led to the invention of the present application.

In order to solve the aforementioned problems, in accordance with one aspect of the present invention, an object detecting actuator comprising of a rotary shaft; a roller lever; and a roller constituted by a sintered body comprising of stainless steel material and impregnated with lubricating oil, wherein a density of stainless steel material is in a range of 6.45 to 6.7 g/cm$^3$, the roller is rotatably attached to the roller lever via the rotary shaft and adapted to receive a load of an external force and adapted to displace the object detecting actuator in accordance with the load of the external force.

According to this configuration, the content of the lubricating oil can be increased by reducing the density of the stainless steel material more than that in the conventional technique. Consequently, it is possible to reduce wear of the roller and the rotary shaft caused by friction generated in the contact portions of the roller and the rotary shaft, and therefore the roller is less likely to rattle. Thus an object detecting actuator with increased durability is provided.

In addition, in the object detecting actuator of the present invention, it is possible to use, for example, an austenitic or martensitic stainless steel material as the stainless steel material.

Furthermore, in the object detecting actuator of the present invention, copper in a range of 1.5 to 3 wt % may be added to the stainless steel material.

According to this configuration, toughness can be improved by adding a predetermined amount of copper to the stainless steel material, and consequently the generation of abraded powder in the contact portions of the roller and the rotary shaft can be suppressed.

Furthermore, in the object detecting actuator of the present invention, ferromolybdenum hard particles in a range of 3 to 15 wt % may be added to the stainless steel material.

According to this configuration, hardness can be increased by adding a predetermined amount of ferromolybdenum hard particles to the stainless steel material, and the generation of abraded powder in the contact portions of the roller and the rotary shaft can also be suppressed.

Furthermore, in order to solve the aforementioned problem, in accordance with another aspect of the present invention, an object detecting switch of the present invention includes the above object detecting actuator and a signal output unit that outputs a signal corresponding to the position of the object detecting actuator.

According to this configuration, an object detecting switch with increased durability can be provided. Thus, the present invention has the effect with which durability can be increased.

DETAILED DESCRIPTION

An embodiment of the present invention will be described with reference to the drawings. In the following description, like symbols are denoted to like components. The names and functions thereof are also the same. Accordingly, detailed descriptions thereof are not repeated.

Figure 1:
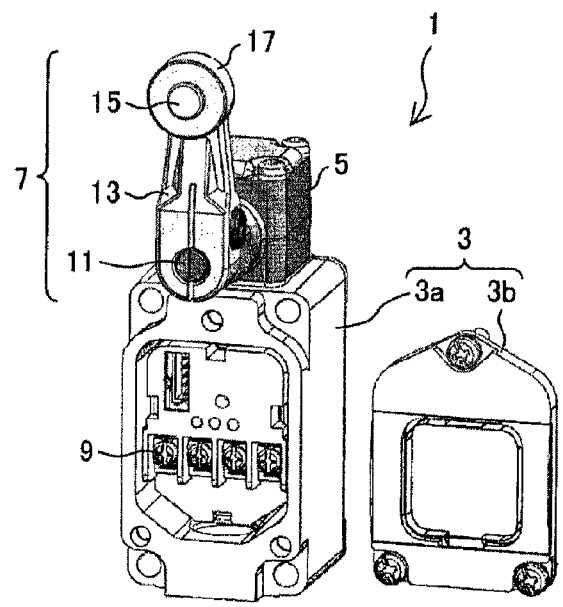
FIG. 1 is a view showing an example of an object detecting switch in the present embodiment.

FIG. 1 is a view showing an example of an object detecting switch in the present embodiment. As shown in FIG. 1, a limit switch 1 serving as the object detecting switch is a switch that detects position, change, movement, passage, and the like, and outputs an ON signal or an OFF signal according to whether or not detection is made.

The limit switch 1 is provided with a casing 3, a block part 5, and an actuator 7 for object detection. The casing 3 has a switch module 9 arranged in an internal space thereof, and protects the switch module 9 from external forces, water, oil, gas, dust, and the like. The casing 3 is made up of a casing main body 3a having an opening through which the switch module 9 is installed in the internal space, and a cover 3b that closes the opening.

The actuator 7 protrudes from the block part 5, is fixed by a fixing member 11, and is able to rotate about the fixing member 11. The position of the actuator 7 when an external force is not applied is the home position. Here, the home position of the actuator 7 is a position oriented toward the 12 o'clock direction of a watch. In FIG. 1, when a force is applied from the left, the actuator 7 rotates in the clockwise direction about the fixing member 11, and thereafter returns to the home position when the force is removed. On the other hand, when a force is applied from the right, the actuator 7 rotates in the anticlockwise direction about the fixing member 11, and thereafter returns to the home position when the force is removed.

When an external force is applied due to contact with a detection body, the actuator 7 transmits the force to the switch module 9 by way of an operation body. Basically, the operation body has a mechanism such as a spring or a cam, and transmits the motion of the actuator 7 to the switch module 9. The switch module 9 outputs a variety of signals, which include a signal indicating that a detection body has been detected, in accordance with the rotation angle of the actuator 7.

The actuator 7 includes a roller lever 13 that is fixed to the fixing member 11, and a roller 17 that is rotatably attached to the roller lever 13 by means of a rotary shaft 15, and the roller lever 13 rotates about the fixing member 11 due to contact between the roller 17 and the detection body. Because the roller 17 rotates due to contact with the detection body, friction with the detection body is reduced.

Furthermore, the roller 17 is formed by the sintering of a stainless steel material. For the stainless steel material used for the roller 17, generally, an Fe—Cr based stainless steel material or an Fe—Cr—Ni based stainless steel material can be used. Examples of the Fe—Cr based stainless steel material include a martensitic stainless steel material (SUS410) and a ferritic stainless steel material (SUS430). Examples of the Fe—Cr—Ni based stainless steel material include an austenitic stainless steel material (SUS304), an austenitic-ferritic stainless steel material (SUS329JI), and a precipitation-hardening stainless steel material. Examples of the precipitation-hardening stainless steel material include a martensitic stainless steel material (SUS630), an austenitic stainless steel material, a semi-austenitic stainless steel material (SUS631), and an austenitic-ferritic stainless steel material.

The density of the sintered body of stainless steel is generally 6.4 to 7.0 g/cm$^3$, but 6.45 to 6.7 g/cm$^3$ is preferable. In addition, the sintered body of stainless steel is impregnated with lubricating oil to improve the lubrication properties of the roller. For example, motor oil, spindle oil, mineral oil, paraffin oil, or the like can be used as the lubricating oil.

Furthermore, the roller 17 may be manufactured by means of sintering, by adding a predetermined amount of copper powder by means of a liquid-phase sintering method and by adding a predetermined amount of ferromolybdenum hard particles. It is therefore possible to improve wear resistance by improving toughness and hardness, and to consequently suppress generation of abraded powder of the roller 17. In particular, although it is preferable that copper is added to an SUS304 sintered body and ferromolybdenum is added to SUS410, ferromolybdenum may be added to an SUS304 sintered body and copper may be added to SUS410. Furthermore, copper and ferromolybdenum may both be added to each of SUS304 and SUS410.

It should be noted that, the amount of copper added is preferably within the range of 1.5 to 3 wt %, because wear resistance is not sufficiently improved if the amount is less than 0.5 wt % and embrittlement is caused if the amount exceeds 4 wt %. The amount of ferromolybdenum added is preferably within the range of 3 to 15 wt %. In particular, by adding ferromolybdenum to SUS410, it is possible to enhance the effect of improving wear resistance.

The rotary shaft 15 is constituted by a stainless steel material and is formed by forging or cutting processing. For the stainless steel material, generally, an Fe—Cr based stainless steel material or an Fe—Cr—Ni based stainless steel material can be used. Examples of an Fe—Cr based stainless steel material include a martensitic stainless steel material (SUS410) and a ferritic stainless steel material (SUS430). Examples of an Fe—Cr—Ni based stainless steel material include an austenitic stainless steel material (SUS304), an austenitic-ferritic stainless steel material (SUS329JI), and a precipitation-hardening stainless steel material. Examples of a precipitation-hardening stainless steel material include a martensitic stainless steel material (SUS630), an austenitic stainless steel material, a semi-austenitic stainless steel material (SUS631), and an austenitic-ferritic stainless steel material.

It should be noted that, for the stainless steel material used for the rotary shaft 15, it is preferable to use SUS410 which is less likely to become brittle at a temperature lower than SUS430 (close to 0° C.). Furthermore, it is preferable that the material used for the rotary shaft 15 is different from the material of the roller 17. This is to prevent adhesion from occurring due to abrasion between members made of the same metal.

Figure 2:
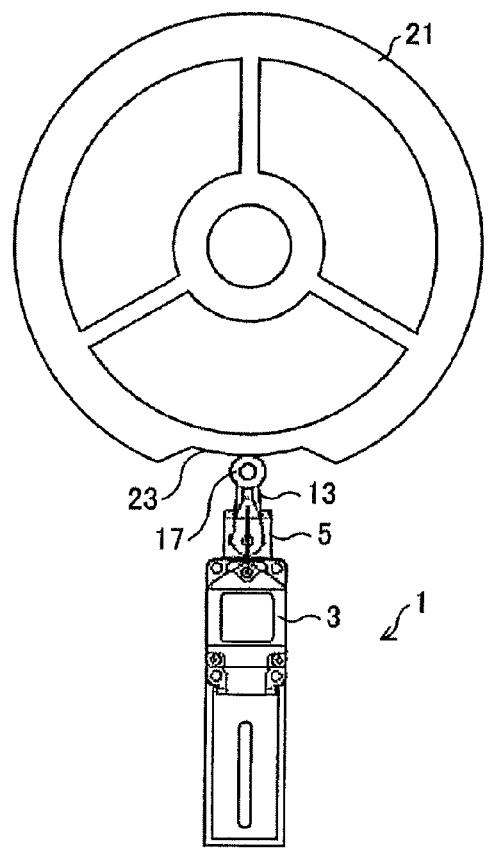
FIG. 2 is a view showing an example of an actuator durability test.

Next, the present invention will be described in more detail by means of the following Examples 1 to 4 and Comparative Example. FIG. 2 is a view showing an example of an actuator durability test. As shown in FIG. 2, the limit switch 1 of each of Examples 1 to 4 and Comparative Example is arranged such that the roller 17 of the actuator 7 abuts a rotary wheel 21 which has a recessed portion 23 having a diameter that is less than the outer diameter of the rotary wheel 21, and the rotary wheel 21 is rotated.

At the recessed portion 23, the actuator 7 is positioned at the home position, and at a portion other than the recessed portion 23, the actuator 7 is rotated to an angle determined by the longitudinal length of the actuator 7 and the length between the fixing member 11 and the rotary wheel 21. These states are alternately repeated due to the rotation of the rotary wheel 21.

Furthermore, when the roller 17 of the actuator 7 comes into contact with the portion other than the recessed portion 23, a load of a certain level or more is applied to the roller 17, and the roller 17 rotates in accordance with the rotating motion of the rotary wheel 21. In this way, the durability test reproduces the motion of the actuator 7 brought about by detection bodies traveling along a production line repeatedly colliding against the limit switch 1.

In the durability test, the lifespan of the roller 17 was determined by repeating the following operation. Rattling of the roller 17 was examined by stopping the rotary wheel 21 during rotation and then removing the actuator 7 from the limit switch 1, and attaching the actuator 7 to the limit switch 1 and then restarting the rotation of the rotary wheel 21.

The lifespan of the roller 17 is determined based on the enlargement of the hole of the roller 17 through which the rotary shaft 15 passes, and the rattling of the roller 17 caused by wear of the rotary shaft 15. The rattling of the roller 17 was measured using a dimension measurement instrument, in a state in which the actuator is assembled. Here, the point in time at which the rattling exceeded a standard value was used to indicate the lifespan of the roller 17, and the travel distance of the roller 17 was calculated from the number of rotations of the rotary wheel 21 and the circumferential length along the outer diameter at this point in time.

It should be noted that an SUS410 stainless steel material was used for the rotary shaft 15 of Examples 1 to 4 and Comparative Example.

In Example 1, the limit switch 1 was configured by the roller 17 that is formed by using an SUS304 sintered body having a density of 6.7 g/cm$^3$, the roller 17 being impregnated with lubricating oil. Motor oil (type 10W-30) was used as the lubricating oil. The oil content of the roller 17 was found to be 7.7 vol %.

In Example 2, the limit switch 1 was configured by the roller 17 that is formed by using an SUS304 sintered body having a density of 6.5 g/cm$^3$, the roller 17 being impregnated with lubricating oil. Motor oil (type 10W-30) was used as the lubricating oil. The oil content of the roller 17 was found to be 11 vol %.

In Example 3, the limit switch 1 was configured by the roller 17 that is formed with a predetermined amount of copper added thereto by infiltrating copper into an SUS304 sintered body having a density of 6.7 g/cm$^3$, the roller 17 being impregnated with lubricating oil. Motor oil (type 10W-30) was used as the lubricating oil. The oil content of the roller 17 was found to be 9.4 vol %. The amount of copper added was 2 wt %.

In Example 4, the limit switch 1 was configured by the roller 17 that is formed with a predetermined amount of ferromolybdenum added to an SUS410 sintered body having a density of 6.7 g/cm$^3$, the roller 17 being impregnated with lubricating oil. Motor oil (type 10W-30) was used as the lubricating oil. The oil content of the roller 17 was found to be 6.4 vol %. The amount of ferromolybdenum added was 8 wt %.

It was understood that the strength of the SUS304 sintered body is not sufficient for practical use and dimensional accuracy thereof is not obtained if the density was less than 6.4 g/cm$^3$, and therefore the density was not set to be less than 6.45 g/cm$^3$.

In Comparative Example, the limit switch 1 was configured by the roller 17 that is formed by using an SUS304 sintered body having a density of 6.9 g/cm$^3$, the roller 17 being impregnated with lubricating oil. Motor oil (type 10W-30) was used as the lubricating oil. The oil content of the roller 17 was found to be 5 vol %.

Figure 3:
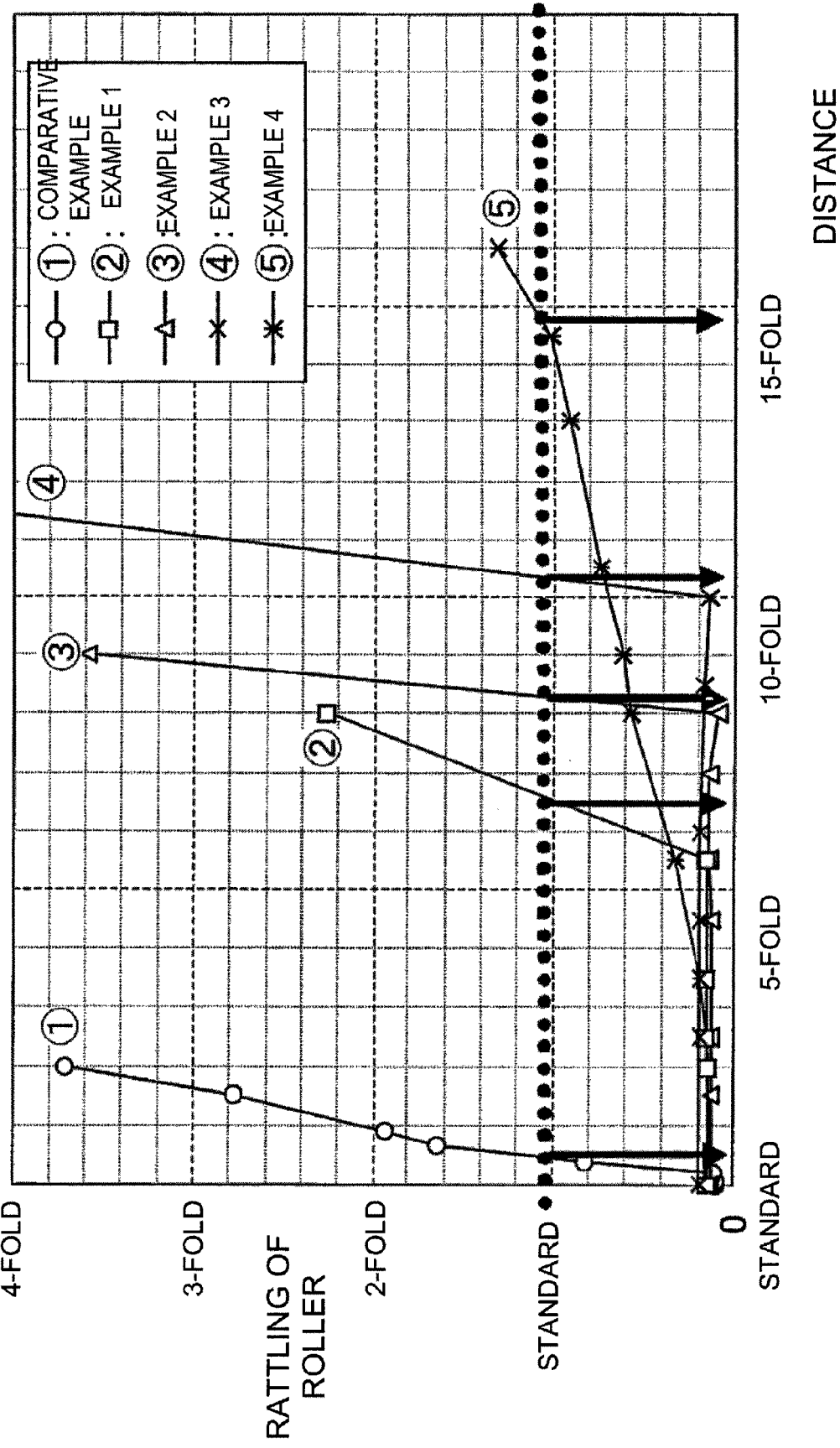
FIG. 3 is a graph showing results of the durability test.

FIG. 3 is a graph showing results of the durability test. The units of the horizontal axis of the graph are based on the travel distance when the roller 17 of Comparative Example reached the life thereof (when the rattling of the roller 17 exceeded the standard value), and the units are shown as multiples thereof. The units of the vertical axis of the graph are based on the rattling of the roller 17 of Comparative Example that was determined to have reached its life, and the units are shown as multiples thereof. As shown in FIG. 3, line graphs 1 to 5 correspond to Comparative Example and Examples 1 to 4, respectively.

As shown by the line graphs 1 and 2, the roller 17 of Example 1 has a lifespan that is approximately 6.5 times greater than that of the roller 17 of Comparative Example. As shown by the line graphs 1 and 3, the roller 17 of Example 2 has a lifespan that is approximately 8 times greater than that of the roller 17 of Comparative Example. As shown by the line graphs 1 and 4, the roller 17 of Example 3 has a lifespan that is approximately 10 times greater than that of the roller 17 of Comparative Example. As shown by the line graphs 1 and 5, the roller 17 of Example 4 has a lifespan that is approximately 15 times greater than that of the roller 17 of Comparative Example.

As shown by the results obtained from the durability test, it was possible to extend the lifespan of the roller 17 commensurately with decrease in density of the SUS304 sintered body within the range of 6.45 to 6.7 g/cm$^3$. It is considered that it was possible to suppress wear between the roller 17 and the rotary shaft 15 since the content of the lubricating oil can be increased commensurately with decrease in density within the range of 6.45 to 6.7 g/cm$^3$.

Furthermore, it was possible to further extend the lifespan of the roller 17 by adding a predetermined amount of copper to the SUS304 sintered body. It is considered that, in addition to the lubrication effect of the lubricating oil, the effect of suppressing the generation of abrasion powder (wear resistance) can be improved as a result of increasing the toughness of the sintered body by adding copper to the sintered body.

Furthermore, it was possible to further extend the lifespan of the roller 17 by changing to an SUS410 sintered body and adding a predetermined amount of ferromolybdenum to the sintered body. It is considered that it was possible to increase the wear resistance of the sintered body as SUS410 has excellent hardening properties and as a result of adding ferromolybdenum to the sintered body.

As described above, the actuator 7 in the present embodiment includes: the roller 17 that receives a load of an external force; and a roller lever 13 to which the roller 17 is rotatably attached by means of a rotary shaft 15, the actuator 7 being a displacement member that is displaced in accordance with the load of the force received by the roller 17, wherein the roller 17 is constituted by a sintered body comprising of stainless steel material and impregnated with lubricating oil, and the density of the stainless steel material is in the range of 6.45 to 6.7 g/cm$^3$.

Therefore, the content of the lubricating oil can be increased by reducing the density of the stainless steel material within a suitable range more than in the conventional technique. Furthermore, physical properties can be improved by adding a suitable additive to the stainless steel material. It is thus possible to reduce wear of the roller 17 and the rotary shaft 15 caused by friction generated between the roller 17 and the rotary shaft 15, and therefore the roller 17 is less likely to rattle. Consequently, durability can be increased.

It should be noted that, in the present embodiment, a limit switch has been described as an example, but the present invention may also be applied to a microswitch.

The present invention is not limited to these embodiments, and a variety of alterations are possible within the scope indicated in the claims. In other words, embodiments obtained by combining technical means appropriately altered within the scope indicated in the claims are also included in the technical scope of the present invention.

There has thus been shown and described an object detecting actuator and an object detecting switch which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An object detecting actuator comprising:
   a rotary shaft;
   a roller lever; and
   a roller constituted by a sintered body comprised of stainless steel material and impregnated with lubricating oil, wherein a density of the stainless steel material is in a range of 6.45 to 6.7 g/cm$^3$, the roller is rotatably attached to the roller lever via the rotary shaft and adapted to receive a load of an external force and adapted to displace the object detecting actuator in accordance with the load of the external force.

2. The object detecting actuator according to claim 1, wherein the stainless steel material is an austenitic stainless steel material.

3. The object detecting actuator according to claim 2, wherein the sintered body further comprises ferromolybdenum hard particles in a range of 3 to 15 wt % of stainless steel material.

4. The object detecting actuator according to claim 2, wherein the sintered body further comprises copper in a range of 1.5 to 3 wt % of the stainless steel.

5. The object detecting actuator according to claim 1, wherein the stainless steel material is a martensitic stainless steel material.

6. The object detecting actuator according to claim 5, wherein the sintered body further comprises ferromolybdenum hard particles in a range of 3 to 15 wt % of the stainless steel material.

7. The object detecting actuator according to claim 5, wherein the sintered body further comprises copper in a range of 1.5 to 3 wt % of the stainless steel material.

8. The object detecting actuator according to claim 1, wherein the sintered body further comprises copper in a range of 1.5 to 3 wt % of the stainless steel material.

9. The object detecting actuator according to claim 4, wherein the sintered body further comprises ferromolybdenum hard particles in a range of 3 to 15 wt % of the stainless steel material.

10. The object detecting actuator according to claim 1, wherein the sintered body further comprises ferromolybdenum hard particles in a range of 3 to 15 wt % of the stainless steel material.

11. An object detecting switch comprising the object detecting actuator according to claim 1.

* * * * *